United States Patent
West (10) Patent No.: US 11,682,842 B1
(45) Date of Patent: Jun. 20, 2023

(54) LOG PERIODIC ARRAY APPLICATION OF MINATURE ACTIVE DIFFERENTIAL/QUADRATURE RADIATING ELEMENTS

(71) Applicant: Rockwell Collins, Inc., Cedar Rapids, IA (US)

(72) Inventor: James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 135 days.

(21) Appl. No.: 17/065,982

(22) Filed: Oct. 8, 2020

(51) Int. Cl.
  *H01Q 11/10* (2006.01)
  *G01S 7/03* (2006.01)
  *G01S 13/02* (2006.01)

(52) U.S. Cl.
  CPC .............. *H01Q 11/10* (2013.01); *G01S 7/03* (2013.01); *G01S 13/0209* (2013.01)

(58) Field of Classification Search
  CPC ....... H01Q 11/10; G01S 7/03; G01S 13/0209; G02B 21/247
  See application file for complete search history.

(56) References Cited

U.S. PATENT DOCUMENTS

| | | | | |
|---|---|---|---|---|
| 3,696,437 A * | 10/1972 | Grant | .................... | H01Q 11/10 343/810 |
| 5,331,453 A | 7/1994 | Lipsky | | |
| 5,952,982 A * | 9/1999 | Jorgenson | .............. | H01Q 11/10 343/797 |
| 7,362,260 B2 | 4/2008 | Cloutier et al. | | |
| 9,831,559 B2 | 11/2017 | West et al. | | |
| 2019/0113609 A1* | 4/2019 | Baheti | ..................... | H01Q 9/045 |
| 2019/0393921 A1 | 12/2019 | Sengupta et al. | | |
| 2020/0099143 A1 | 3/2020 | White et al. | | |

FOREIGN PATENT DOCUMENTS

EP    0709914 B1    1/2000

OTHER PUBLICATIONS

Rajanarendra, Sai, and R. Nakkeeran. "A comparitive study of four different shaped frequency reconfigurable log periodic microstrip antenna arrays." Int. J. Microwaves Appl 2, No. 2 (2013). (Year: 2013).*
U.S. Appl. No. 16/789,908, filed Feb. 13, 2020, entitled Differential Quadrature Radiating Elements and Feeds.
U.S. Appl. No. 16/825,235, filed Mar. 20, 2020, entitled UWB Spread Spectrum Power Spatial Combining Antenna Array.

* cited by examiner

*Primary Examiner* — Bernarr E Gregory
*Assistant Examiner* — Yonghong Li
(74) *Attorney, Agent, or Firm* — Suiter Swantz pc llo (57) ABSTRACT

A low-profile, ultra-wideband, conformal antenna is actively driven by a four-port quadrature feed circuit for both cardioid and monopole radiation patterns. The quadrature four-port and differential two-port driven radiating elements are organized into a log periodic array that is driven without frequency dispersion. The log periodic array may produce circularly polarized beams. For radiating elements that do not operate via a ground plane, stepped artificial magnetic conductors isolate the drive circuitry.

15 Claims, 14 Drawing Sheets

Table I
Useful Values of $X_{a1}$

| | $TM_{21}$ | $TM_{31}$ | $TM_{41}$ | $TM_{51}$ | $TM_{61}$ |
|---|---|---|---|---|---|
| $X_{a1}$ | 3.054 | 4.201 | 5.317 | 6.415 | 7.501 |

LOG PERIODIC ARRAY APPLICATION OF MINATURE ACTIVE DIFFERENTIAL/QUADRATURE RADIATING ELEMENTS

BACKGROUND

Low profile ultra-wideband directional antennas can be fabricated on doubly curve conformal surfaces for low visibility and low-RCS applications. Quadrature fed 4-port radiating elements offer superior performance both omnidirectional and active electronically scanned array, for both cardioid and monopole radiation pattern modes.

The state-of-the-art in passive quadrature combiner feed networks are too physically large with non-optimal performance even for omni-directional antennas. Existing attempts at size compaction drive multi-layer printed circuit board with undesirable complexity, especially for active electronically scanned array applications.

Printed circuit board based active electronically scanned arrays have a manufacturing sweet-spot of approximately C Band—Ka Band due to printed circuit board material, fabrication and assembly constraints. Active electronically scanned array scan performance is hindered by the high dielectric constant for wafer embedded radiation elements. Current apertures are challenged by parasitic mode generation and low assembly yield.

SUMMARY

In one aspect, embodiments of the inventive concepts disclosed herein are directed to a low-profile, ultra-wideband, conformal antenna. The antenna is actively driven by a four-port quadrature feed circuit for both cardioid and monopole radiation patterns.

In a further aspect, the quadrature four-port and differential two-port driven radiating elements are organized into a log periodic array. The log periodic array may be driven by elements with stepped artificial magnetic conductors tailored to the operating frequency of the radiating element.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

The concepts disclosed herein may be more fully understood with reference to U.S. Pat. No. 9,831,559, U.S. patent application Ser. No. 16/789,908, and U.S. patent application Ser. No. 16/825,235.

Broadly, embodiments of the inventive concepts disclosed herein are directed to a low-profile, ultra-wideband, conformal antenna. The antenna is actively driven by a four-port quadrature feed circuit for both cardioid and monopole radiation patterns. The quadrature four-port and differential two-port driven radiating elements are organized into a log periodic array. The log periodic array may be driven by elements with stepped artificial magnetic conductors tailored to the operating frequency of the radiating element.

Figure 1:
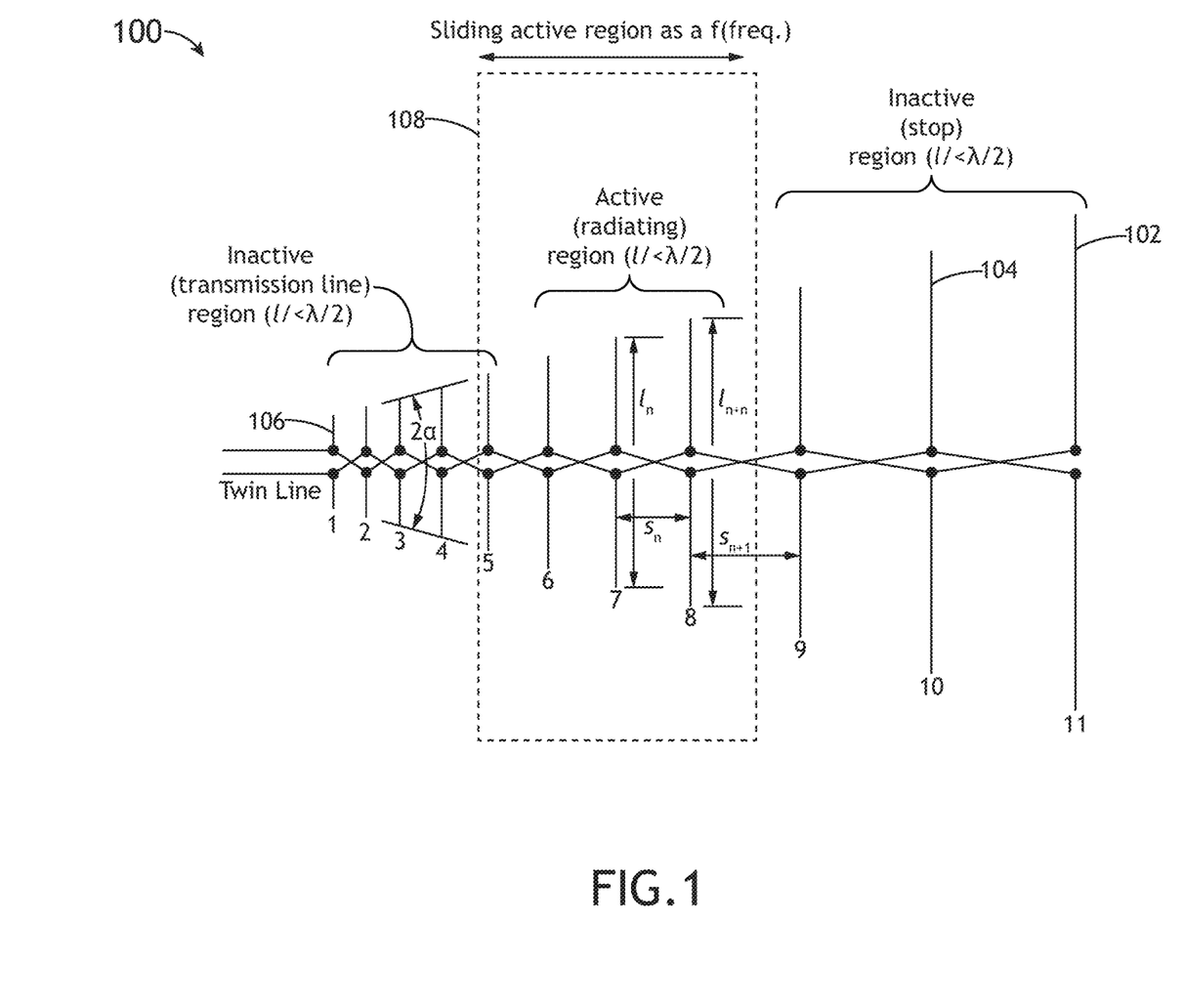
FIG. 1 shows a block diagram of a log periodic antenna useful for implementing exemplary embodiments.

Referring to FIG. 1, a block diagram of a log periodic antenna 100 useful for implementing exemplary embodiments is shown. In at least one embodiment, log periodic antennas 100 comprise a plurality of radiating elements 102, 104, 106, each configured to transmit and/or receive signals in a particular frequency range. Traditionally, the log periodic antenna 100 has an active region 108 defined by the current frequency of the signal being transmitted and/or received. In at least one embodiment, each radiating element 102, 104, 106 is associated with one of a plurality of driving elements, each driving element configured for operation in a distinct sub-band of the entire operating range of the log periodic antenna 100 corresponding to an active region 108. In such embodiments, the entire log periodic antenna 100 may be actively driven.

Existing passive feed is realized as a crisscrossed feed to add 180° phase shift between radiating elements 102, 104, 106. Adjacent radiating elements 102, 104, 106 are out of phase to minimize parasitic interaction. Larger and longer radiating elements 102, 104, 106 radiating with an inter-element phase shift may produce an end-fire radiation pattern.

Figure 2:
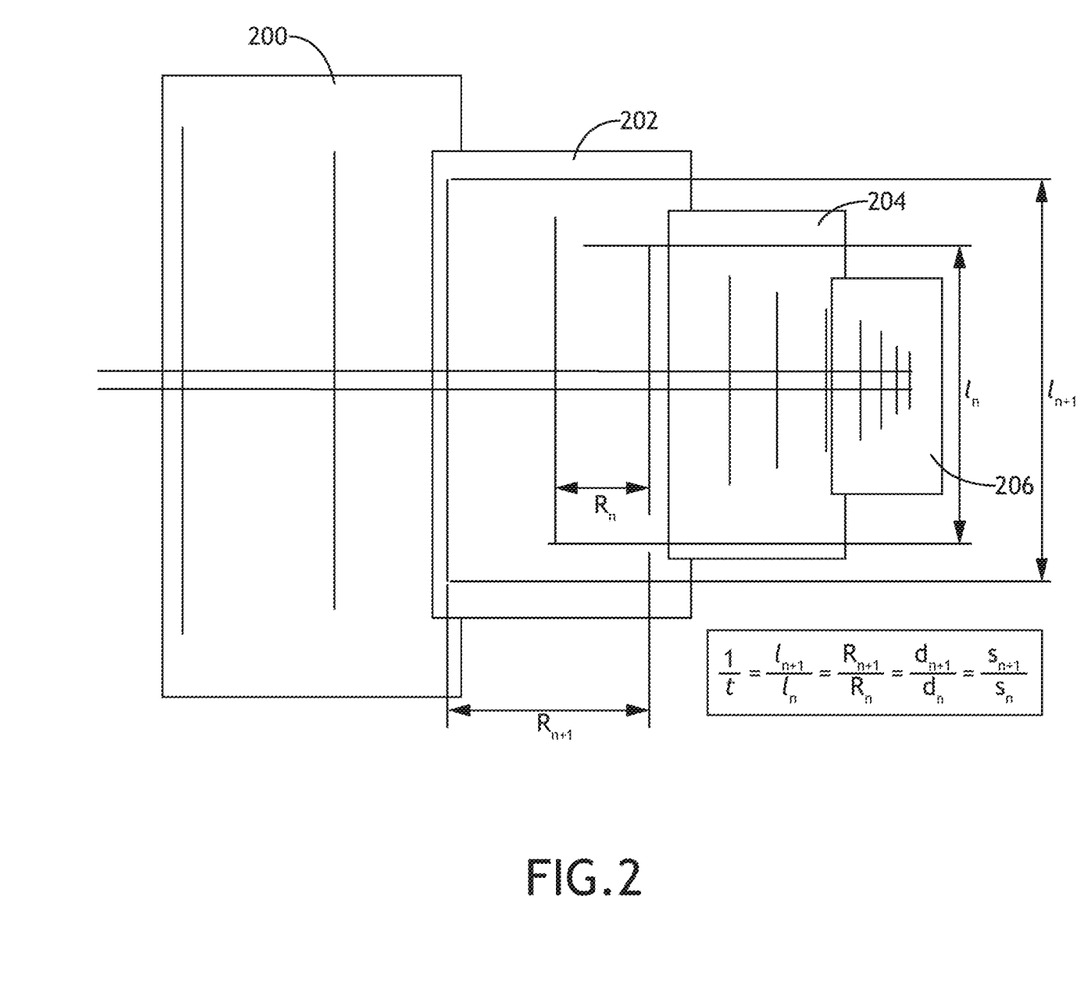
FIG. 2 shows a block diagram of a log periodic antenna useful for implementing exemplary embodiments.

Referring to FIG. 2, a block diagram of a log periodic antenna useful for implementing exemplary embodiments is shown.

In at least one embodiment, sub-segments 200, 202, 204, 206 of the array may be driven coherently or non-coherently; coherent for tridiagonal ultra-wide band directional comm, etc., modes; non-coherent for broadband white noise jammer application.

In at least one embodiment, stepped artificial magnetic conductors may be used in conjunction with the active quadrature feed-based active log periodic array to realize an extremely low profile conformal ultra-wide band array with horizontal polarization. Each stepped artificial magnetic conductor may be tuned for individual radiating elements or sub-segments 200, 202, 204, 206, each corresponding to a frequency range.

Figure 3:
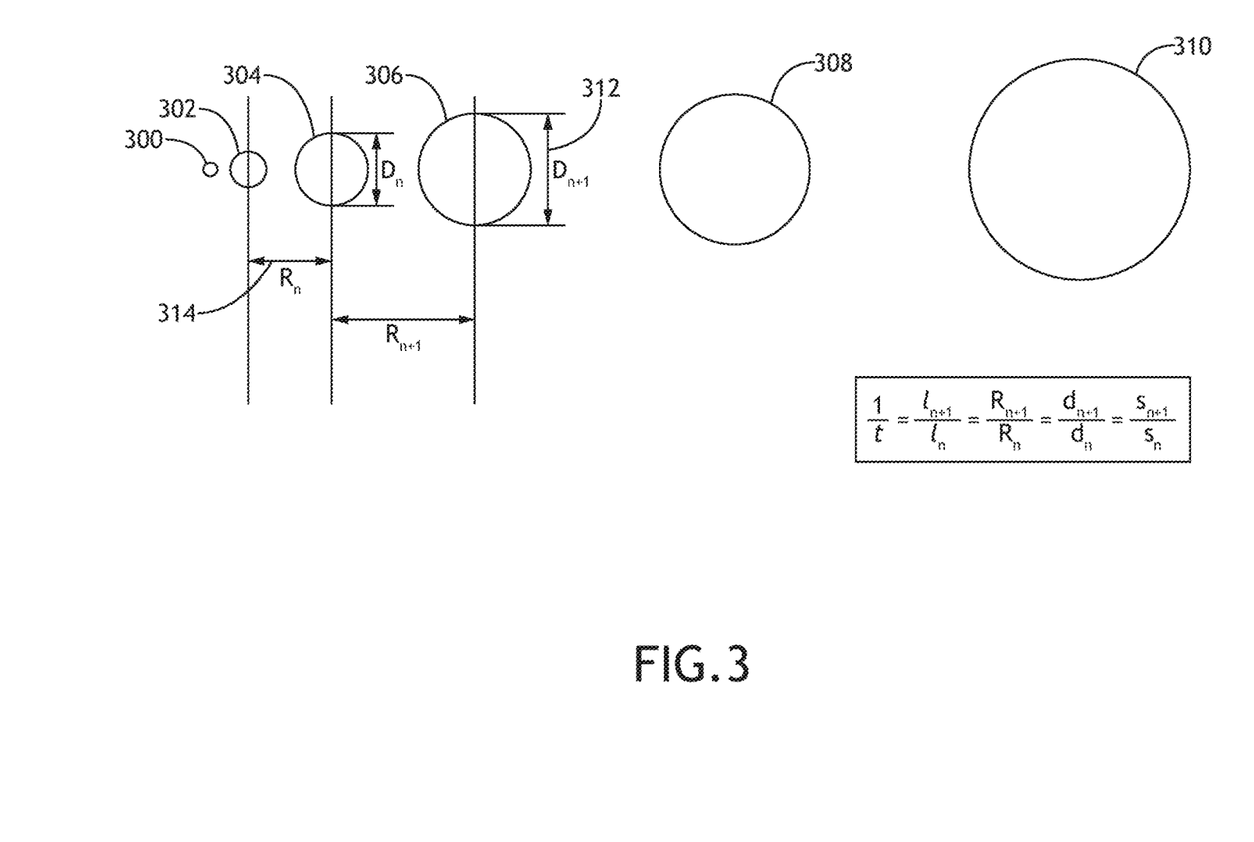
FIG. 3 shows a block diagram of log periodic radiating elements useful for implementing exemplary embodiments.

Referring to FIG. 3, a block diagram of log periodic radiating elements 300, 302, 304, 306, 308, 310 useful for implementing exemplary embodiments is shown. The radiating elements 300, 302, 304, 306, 308, 310 each have a diameter 312 defined by the intended frequency band in which the specific radiating element 300, 302, 304, 306, 308, 310 is configured to operate. Furthermore, the radiating elements 300, 302, 304, 306, 308, 310 are separated by an inter-element separation 314 ($R_n$) defined by the operating bands of the antenna and a scaling factor $\tau$ such that:

$$1/\tau = l_{n+1}/l_n = R_{n+1}/R_n = d_{n+1}/d_n = s_{n+1}/s_n$$

Log periodic arrays may be Implemented with many types of radiating elements 300, 302, 304, 306, 308, 310, including dipoles, patches, slots, helical, spirals, horns, dipoles above ground, dielectric resonator antennas (DRA), etc. Both normal and end-fire radiation is possible. The elements can be of any polarization state. Additionally, sub-band polarization diversity can be implemented for sub-channel isolation as needed; for example, one of two adjacent sub-bands (channels) may be used for information transmission, while the other sub-band (channel) may be used for noise jamming.

Figure 4:
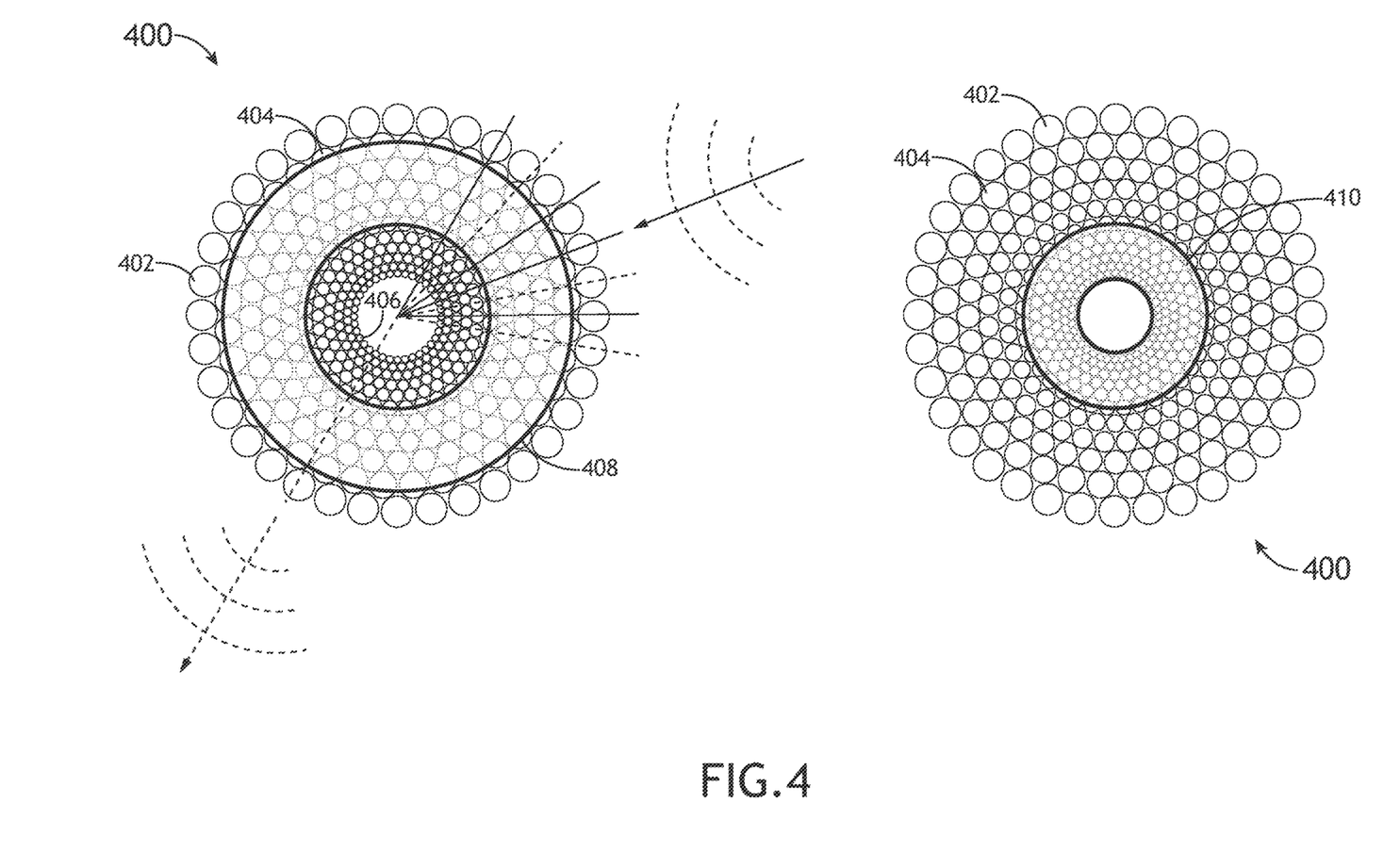
FIG. 4 shows representation of a planar log periodic antenna useful form implementing exemplary embodiments.

Referring to FIG. 4, representation of a planar log periodic antenna 400 useful form implementing exemplary embodiments is shown. The planar log periodic antenna 400 comprises a plurality of planar radiating elements 402, 404, 406 disposed substantially in a substantially 2D plane. The diameter of each radiating element 402, 404, 406 is defined by the operating frequency band of the radiating element 402, 404, 406 (and corresponding set of similar radiating elements 402, 404, 406).

Existing planar log periodic antennas 400 have an active region 408, 410 defined by the frequency of the signal being transmitted and/or received, and is characterized by a bandwidth ratio of the corresponding outer diameter and inner diameter. In at least one embodiment, each radiating element 402, 404, 406 is associated with one of a plurality of driving elements, each driving element configured for operation in a distinct sub-band of the entire operating range of the log periodic antenna 400 corresponding to an active region 408, 410. In such embodiments, the entire log periodic antenna 400 may be actively driven.

Planar log periodic antennas 400 may be implemented as microstrip patch arrays. The ultra-wide band signal comprises a directional beam perpendicular to the antenna 400 surface. Log periodic dimensional growth enables ultra-wide band operation. An intertwined, spoke wheel cardioid/monopole radial LDA structure enables ultra-wide band, actively driven electronically scanned array wide scan performance.

Existing antennas traditionally require a rigid, planar, non-conformal printed circuit board. There is a trade between individual radiating element thickness, stiffness, and band width required for log periodic operation. Optimal radiating elements 402, 404, 406 may be chosen to remove mechanical rigidity from the array. In at least one embodiment, the log periodic structure may comprise a flexible blanket that may be deployed as a conformal mount onto an arbitrarily double curved surface.

Figure 5:
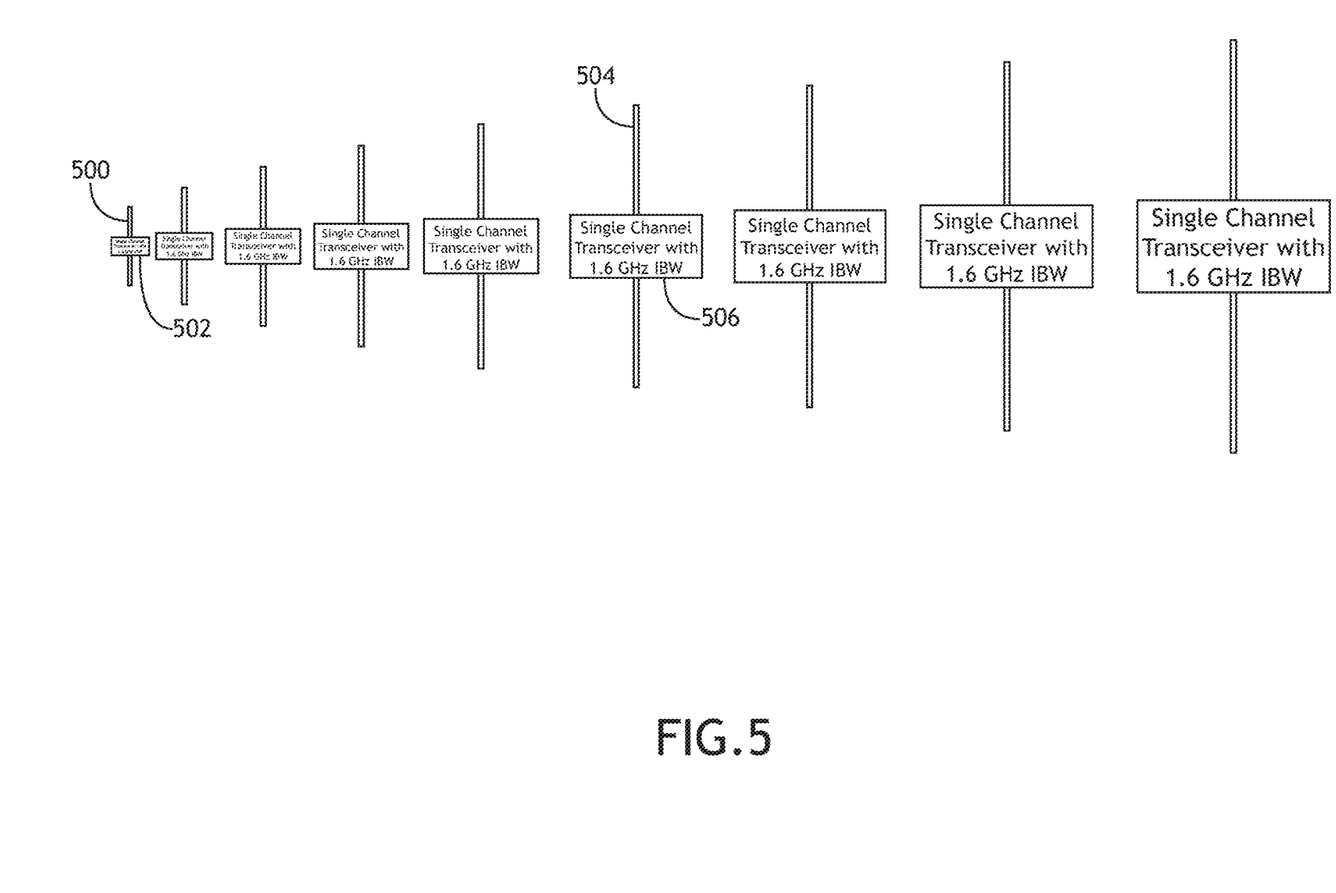
FIG. 5 shows a block representation of log periodic radiating elements according to an exemplary embodiment.

Referring to FIG. 5, a block representation of log periodic radiating elements 500, 504 according to an exemplary embodiment is shown. Each radiating element 500, 504 is associated with a transceiver 502, 506 configured to operate in a sub-band, and in particular a sub-band having 1.6 GHz bandwidth. Passive feed of the various radiating elements 500, 504 is replaced with an active, coherent electronic channel feeding each radiating element 500, 504 (for example, an active, coherent 1.6 GHz electronic channel). Amplitude phase shift (time delay) of the individual active RF channels replicate frequency impedance and current excitation dependence normally associated with a log periodic antenna passive feed.

Figure 6:
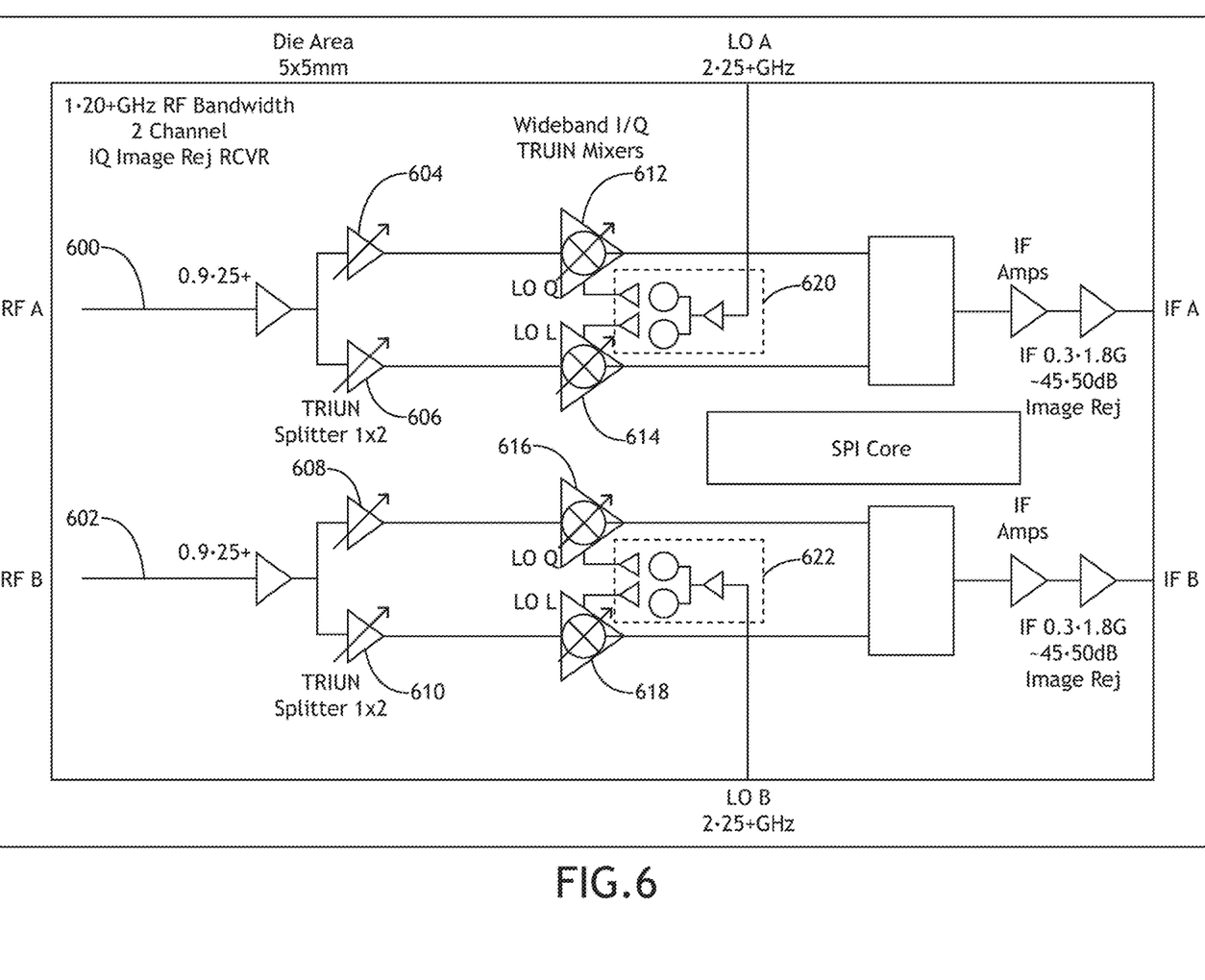
FIG. 6 shows a block diagram of a circuit for driving a log periodic array of radiating elements.

Referring to FIG. 6, a block diagram of a circuit for driving a log periodic array of radiating elements is shown. A quadrature circuit according to an exemplary embodiment comprises at least two input ports 600, 602, each in data communication with a system of amplifiers, including variable gain amplifiers 604, 606, 608, 610. Each system of amplifiers feeds an I or Q channel including a tunable wideband I/Q mixer 612, 614, 616, 618. The tunable wideband I/Q mixers 612, 614, 616, 618 are controlled by corresponding control elements 620, 622, controlled via a corresponding local oscillator. Tuned, amplified output signals actively feed corresponding radiating elements in a log periodic array. Such radiating elements may be embodiment is a microstrip array.

A common microstrip feed layer may be fabricated in advanced RF flexible printed circuit board materials, cut for specific conformal mounting. The radiating elements may be integrated within a multi-layer flex or rigid flex printed wiring board, or configured as individual elements that are die attached to a common ground plane/array feed flex circuit. The flex structure may be patterned such that it can be mapped accurately onto a curved surface.

In at least one embodiment, a low-profile active log periodic array with traditional cardioid pattern utilizing the active quadrature feed in conjunction with radiating elements with superior circular polarization performance may be realized.

Figure 7:
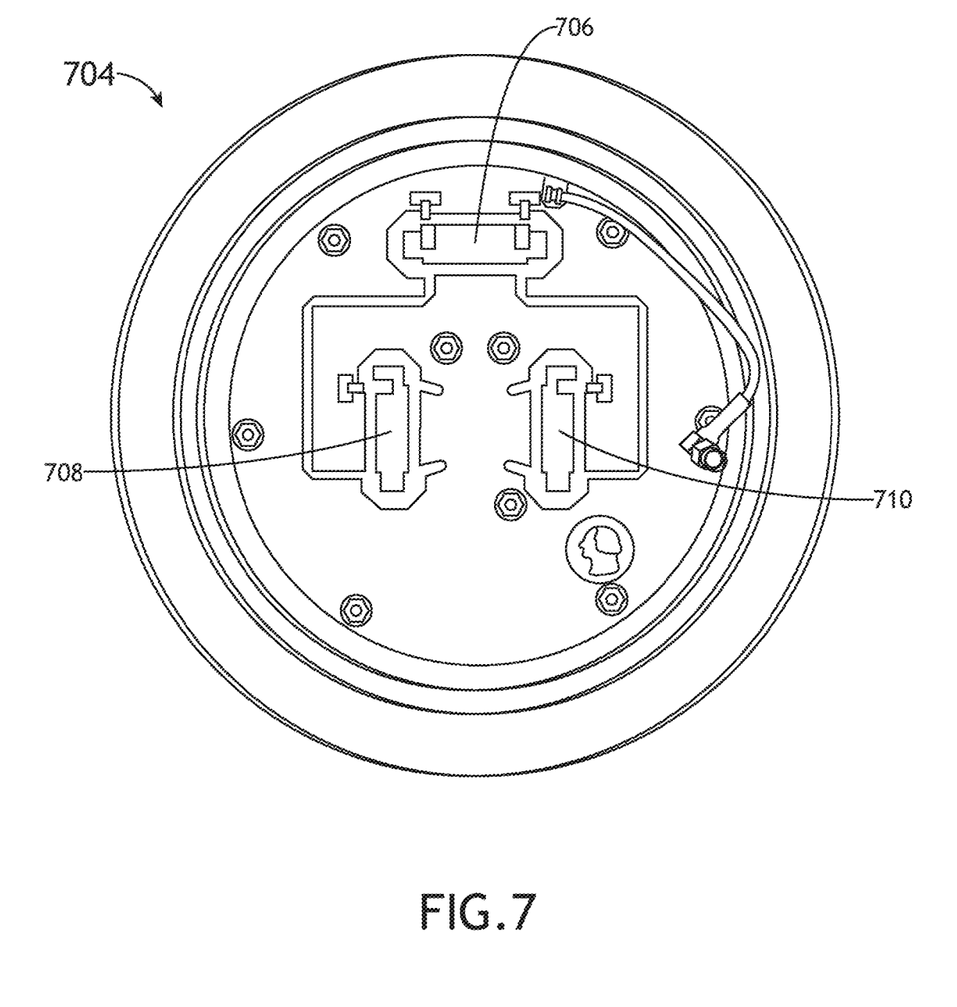
FIG. 7 shows a top view of a passive feeder for a helical antenna.

Referring to FIG. 7, a passive feeder 704 is shown. The quadrifilar helical antennas comprises a helical radiating element. Passive quadrature combiners 704 may include a first splitter/combiner 706 that receives a signal from, or delivers a signal to, an RF source. The first splitter/combiner 706 feeds secondary splitters/combiners 708, 710 that directly feed helical radiating elements to produce a radiating pattern. Such passive quadrature combiners 704 create noise and diminish effective isotropic radiated power between radiating elements and the low-noise amplifiers. Passive Quadrature Combiners 704 have a wavelength dependent circuit surface area on the order of 110 mm by 110 mm (12,321 mm$^2$), 8% instantaneous bandwidth, approximately −2.0 dB fixed insertion loss, and a fixed quadrature phase.

As compared to passive quadrature combiners, active quadrature feed combiners allow for electronic adjustment of the amplitude/phase/delay from nominal quadrature settings to enable polarization diversity, and pattern shaping/nulling in addition to size reduction.

Referring to FIGS. 8A-8D, originally Constantine A. Balanis, Antenna Theory: Analysis and Design, 8$^{rd}$ Ed. (2005) and T. Chiba, Y. Suzuki, N. Miyano, Suppression of higher modes and cross polarized component for microstrip antennas (1982), a circular microstrip patch 802, feeding method diagram, and corresponding radiation pattern 830 diagram are shown; microstrip patches are high Q, narrow band, and typically require specific tuning during production. A circular microstrip patch 802 disposed on a dielectric substrate 800 is fed by two or more vias 804, 810, 818, 820 (and potentially four vias 804, 810, 818, 820) connected to an RF source by corresponding coaxial connectors 806 (or similar signal transmission features). The one or more vias 804, 810, 818, 820 may pass through an opening of ground plane layer 808. In at least one embodiment, the circular microstrip patch 802 is connected to the ground plane layer 808 by a separate ground plane via 812.

In at least one embodiment, for the narrow band application where the circular microstrip patch 802 is fed by two signals to two coaxial connectors and vias 804, 810 (as in FIG. 8B), a splitter 814 may split the input signal 816. The split signal (which may also be phase transformed) is sent to the two coaxial connectors and vias 804, 810, which are disposed 90° apart. Two orthogonal feeds enable circular polarization but produces a high Q with very narrow circular polarization band width.

In at least one embodiment, for example where the circular microstrip patch 802 is fed by four signals to four coaxial connectors and vias 804, 810, 818, 820 (as in FIG. 8C), splitters 822, 824, 826 may split the input signal and delays 828 may alter the phase of the corresponding signals. The split and phase adjusted signals are sent to the four coaxial connectors and vias 804, 810, 818, 820 to produce a radiating pattern 830 as measured experimentally and calculated by various models. Four quadrature feed excited patches are known to have superior circular polarization performance relative to dual orthogonal feed embodiments, but passive quadrature feeds are physically larger than the radiating element itself.

In at least one embodiment, radiating elements may be low profile, free-space, non-ground plane driven elements. In such embodiments, artificial magnetic conductors may be used in the driving circuitry. Artificial magnetic conductors are generally not ultra-wide band. In embodiments where the radiating elements are organized into log periodic arrays, scaled artificial magnetic conductors may be designed logarithmically along with the radiating element dimensions and spacing, and incorporated into the driving circuitry for ultra-wide band performance with overlapping frequency transition regions. Such non-ground plane driven radiating elements may comprise horizontal dipoles which are not corrupted by parasitic interaction with the ground plane. Drive circuitry with stepped artificial magnetic conductors is directly compatible with active quadrature feed driven antenna feed structures; alternatively, may be passive or actively tunable, or both. The stepped artificial magnetic conductor/electromagnetic band gap layer scales with the log periodic array to allow low profile, non-ground plane driven elements.

Figure 8A:
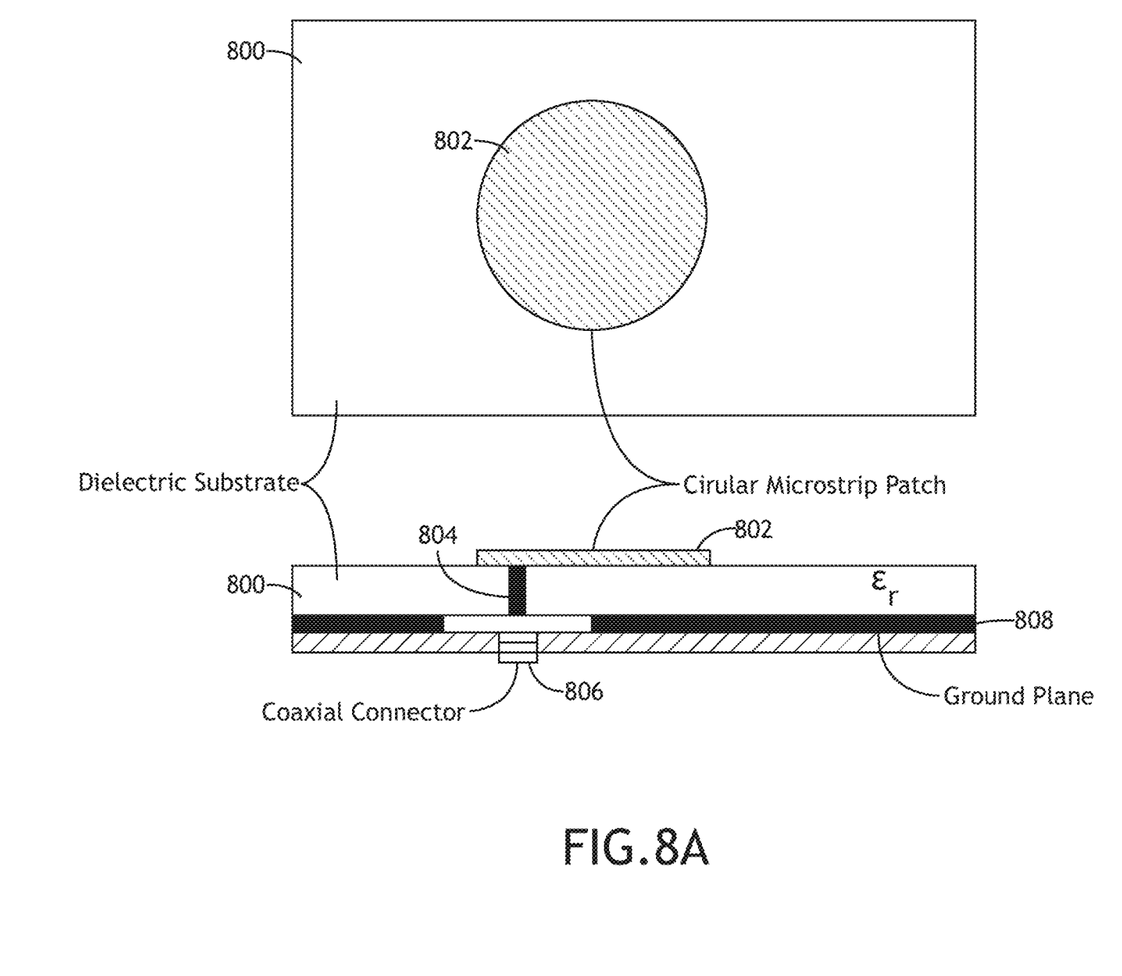
FIG. 8A shows a top view and side view of a circular microstrip patch.
Figure 8B:
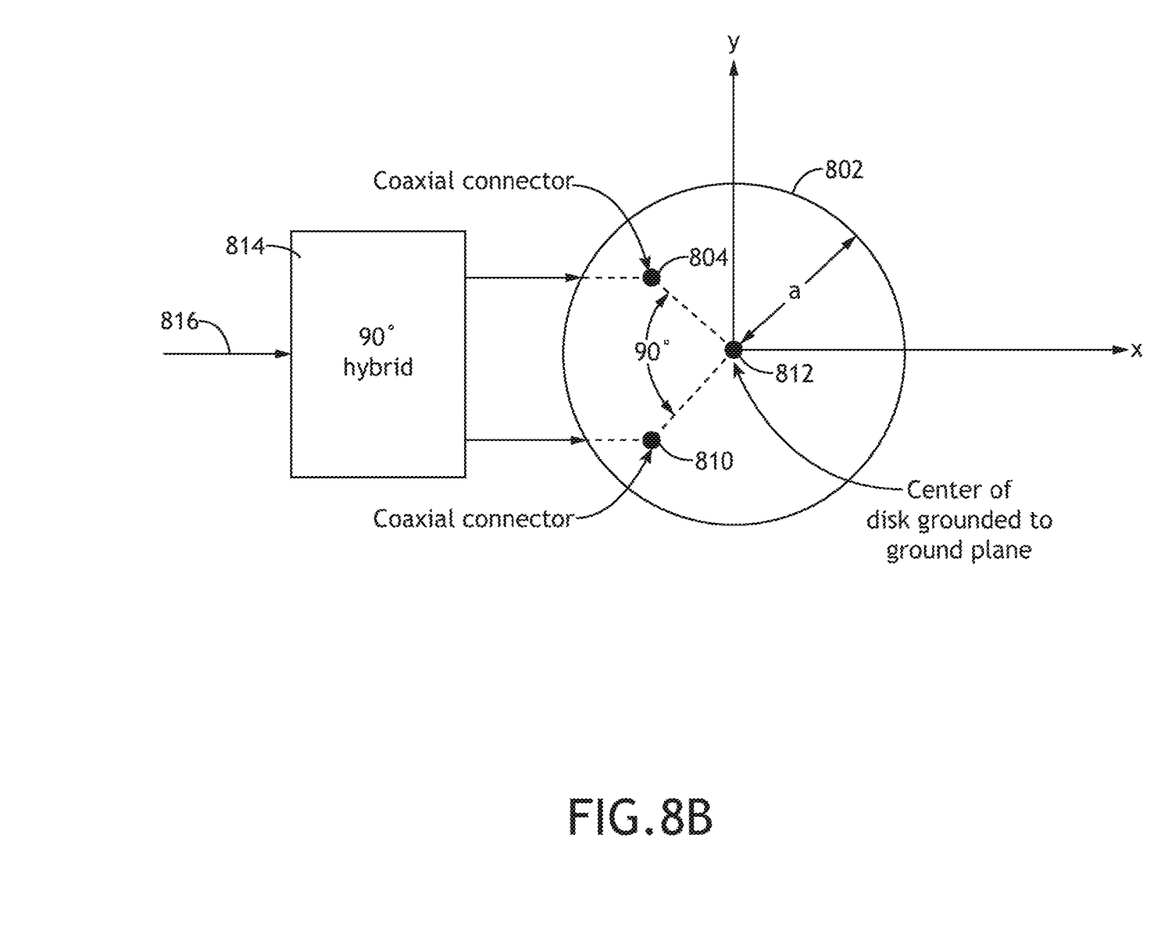
FIG. 8B shows a diagram of a two-probe fed circular microstrip patch.
Figure 8C:
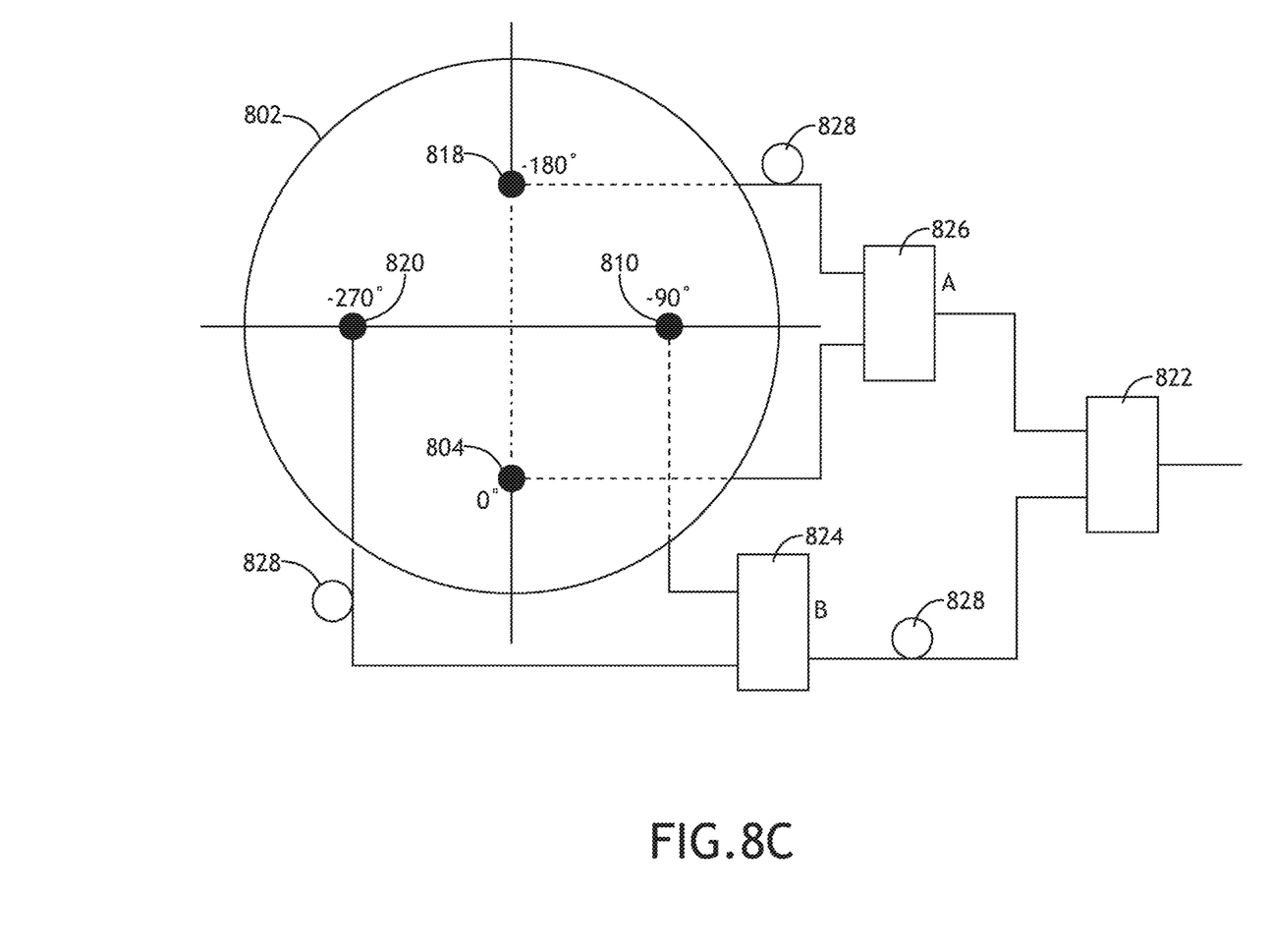
FIG. 8C shows a diagram of a four-probe feeding method.
Figure 8D:
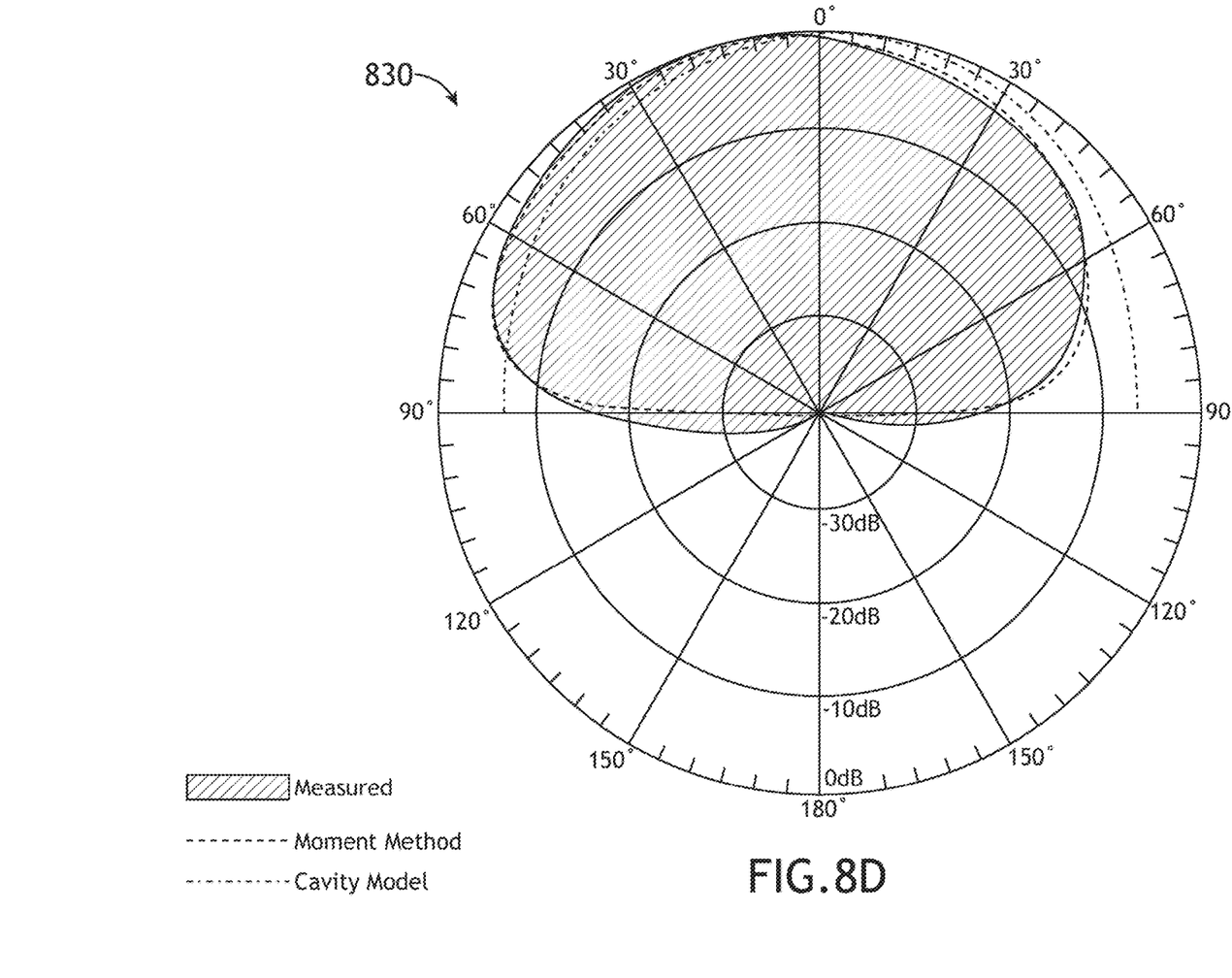
FIG. 8D shows a radiation pattern diagram for a microstrip patch.

In some embodiments, an antenna may be realized via microstrip patch 802, quadrifilar helix, dielectric resonator antenna, etc. Antennas according to some embodiments enable an end-fire active log periodic array with multi-feed end-fire radiating elements within the log periodic array for monopole like end fire radiation for low to the horizon applications with extremely low antenna array height.

The quadrature feed-based active log periodic array can be driven in the front-fire or back-fire directional radiation modes by virtue of active quadrature feed electronic adjustment. The array may be dynamically switched between the front-fire and back-fire directional radiation modes by virtue of the dynamic adjustment of the active quadrature feed-based array feed.

A quadrature fed log periodic structure removes frequency dispersion. An ultra-wide band log periodic array in full aperture mode where the entire antenna structure is excited simultaneously by virtue of the active quadrature feed-based array feed may obviate frequency dispersion.

Figure 9A:
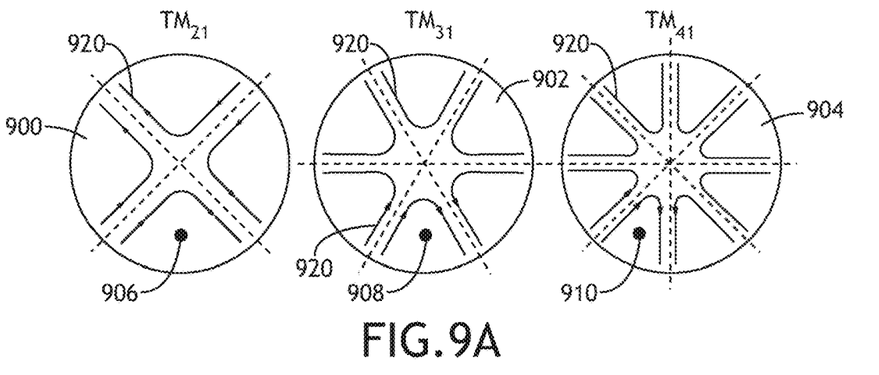
FIG. 9A shows a diagram of magnetic fields under a circular patch.
Figure 9B:
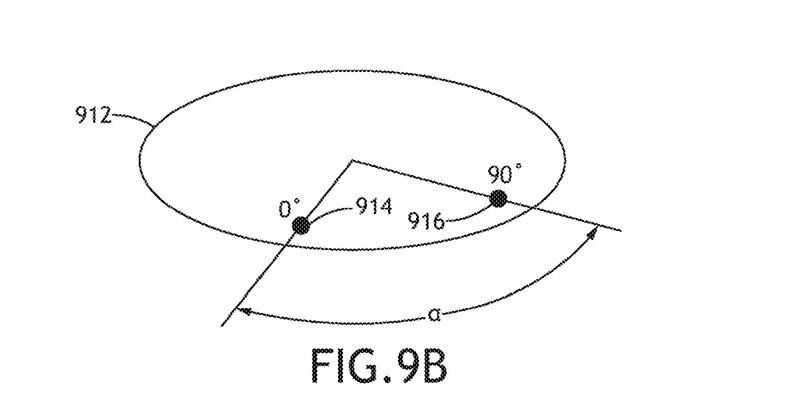
FIG. 9B shows a perspective diagram of angular spacing of two-probe feeds.
Figure 9C:
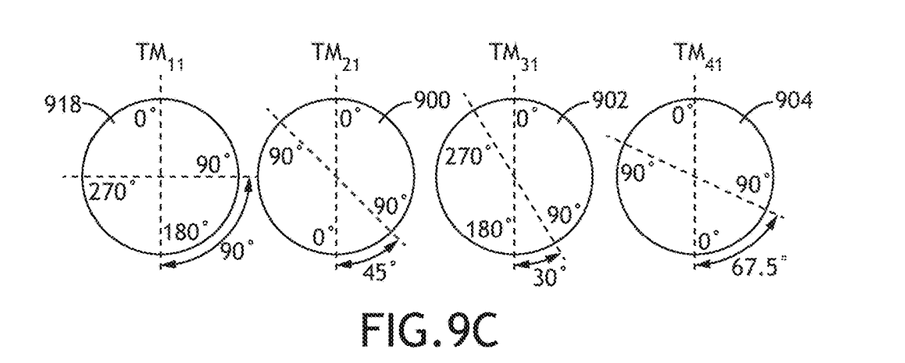
FIG. 9C shows a diagram of angular spacing of four-probe feeds.

Referring to FIGS. 9A-4D, originally from John Huang, Circularly Polarized Conical Patterns from Circular Microstrip Antennas (1984), a diagram of magnetic fields under a circular microstrip patch, angular spacing of two-probe feeds, angular spacing of four-probe feeds, and the corresponding radiation pattern diagram are shown. Under certain defined signal conditions, vias 906 908, 910 may excite the corresponding radiating element 900, 902, 904 to produce magnetic fields 920 that define sectors of the radiating element 900, 902, 904. It may be appreciated that while only one via 906 908, 910 is shown, more than one via 906 908, 910 may be used; for example, two or four vias 906 908, 910 are contemplated. Specifically (as in FIG. 9A), a circular microstrip patch 912 may include two vias 914, 916 disposed 90° apart. In at least one embodiment, where the circular microstrip patch 900, 902, 904, 918 is fed by four vias, magnetic fields may be generated that define 30°, 95°, 67.5°, 90°, or higher resonate modes to achieve monopole-like end fire radiation. Such embodiments may generate various radiating patterns 920 according to the number of resonant modes.

Figure 9D:
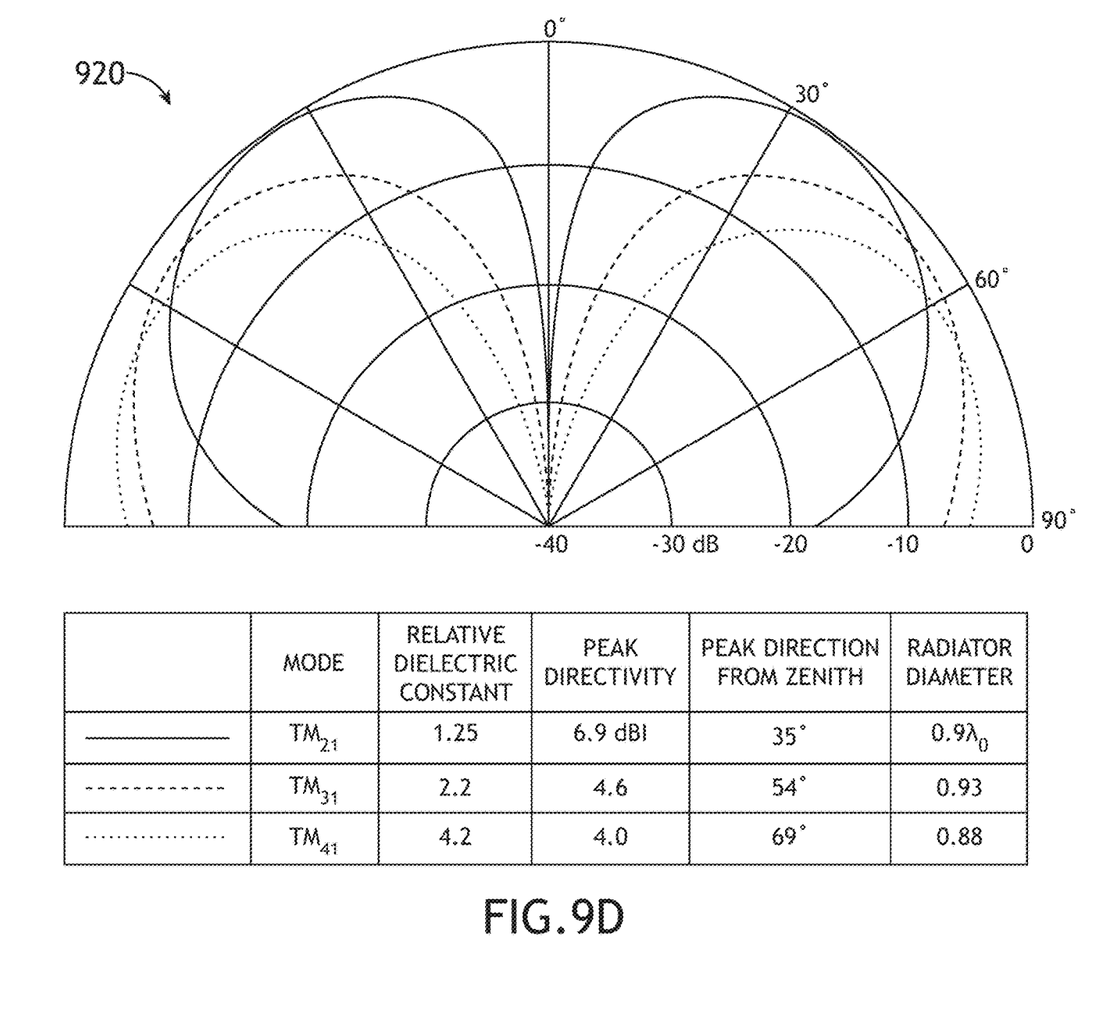
FIG. 9D shows a radiation pattern diagram of higher order modes for a circularly polarized circular microstrip patch.

Referring to the table if FIG. 9D, the TM41 mode has a low angle vertically polarized radiation pattern that is suitable for many system applications. The balanced nature of four-feed quadrature tends to suppress higher ordered asymmetric modes. As compared to active quadrature, passive quadrature feeds are typically narrow band and therefore need to be uniquely designed for the intended mode of operation. For omnidirectional applications it is possible for an active quadrature combiner, with amplifier gain, to superimpose two patch antennas, each of the TM11 and TM41, modes, if non-phase center coincidence is tolerable in terms of greater systems requirements.

Figure 10A:
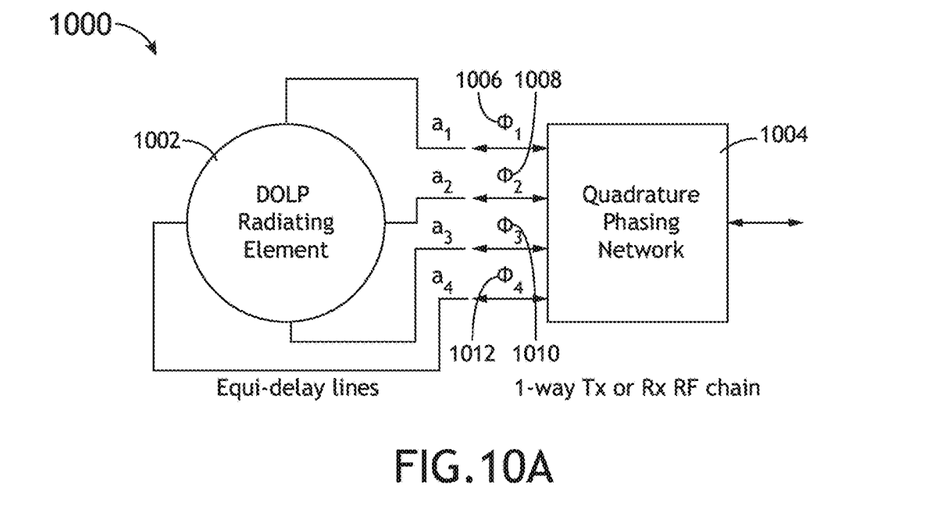
FIG. 10A shows a block diagram of a dual-polarized radiating element and quadrature feed network.
Figure 10B:
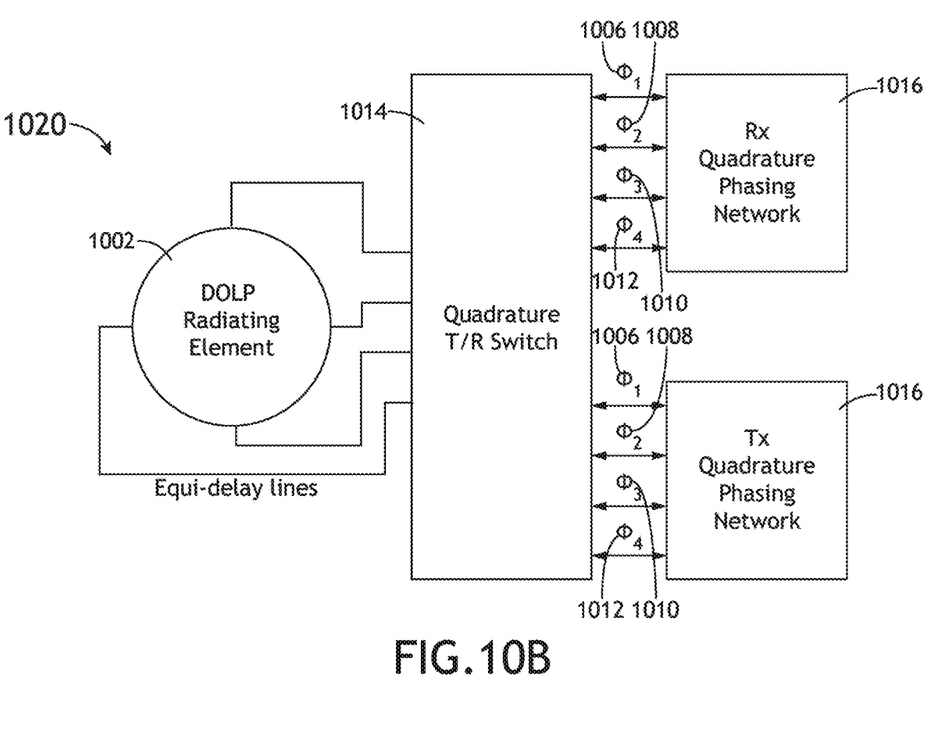
FIG. 10B shows a block diagram of a dual-polarized radiating element and quadrature feed network.

Referring to FIGS. 10A-10B, block diagrams of a quadrature fed radiating element 1002 and quadrature feed network 1004, 1016, 1018 are shown. Quadrature fed radiating elements 1002 are fed by four signals 1006, 1008, 1010, 1012, each offset in phase according to the desired radiating pattern. The four signals 1006, 1008, 1010, 1012 are produced by quadrature phasing networks 1004, 1016, 1016, 1018 (for example, the feed circuitry shown in FIG. 6). In at least one embodiment, the quadrature fed radiating elements 1002 may comprise dual orthogonal polarized radiating elements.

In at least one embodiment 1000, where the feed circuitry is configured for transmit or reception, the quadrature phasing network 1004 is configured to produce signals 1006, 1008, 1010, 1012 with 90° phase disparity.

In at least one embodiment 1020, where the feed circuitry is configured for transmit and reception, a reception quadrature phasing network 1016 is configured to receive signals 1006, 1008, 1010, 1012 with 90° phase disparity. Furthermore, a transmission quadrature network 1018 is configured to produce signals 1006, 1008, 1010, 1012 with 90° phase disparity. First order, active quadrature feed RF integrated circuit size is independent of frequency over its operating band. Variable gain/phase enables precise calibration with less than 0.05 dB and 0.25° phase tuning resolution low-noise amplifiers with stages that can be integrated into the active quadrature feed for optimal reception noise. An amplifier can be integrated into the active quadrature feed to drive the radiating element for optimal transmission effective isotropic radiated power. Fixed tuned or tunable low pass, high pass, band stop, or band pass filters can be integrated in the integrated for electromagnetic interference protection and jammer signal immunity.

Variable gain/phase enables precise calibration, statically and dynamically optimal axial ratio, dynamic axial ratio adjustments applicable to wide scan circular polarization active electronically scanned array architectures. Furthermore, polarization diversity, arbitrarily inclined linear polarization, and arbitrary elliptical polarity which enables increased system channel capacity, multipath rejection, nulling within the radiating element's radiation pattern, dynamic polarizations matching, etc. Such architecture is applicable to transmit only, reception only, or half duplex active electronically scanned array architectures.

Active quadrature feed with two-port and four-port feed antenna elements in a log periodic array provides nondispersive ultra-wide band directional operation with low profile, miniature radiating elements. Such log periodic array may have high circular polarization performance.

Embodiments may be useful for ultra-wide band, time delay steered, 2D architecture. Adjusting the delay with an active feed allows either a "nose orientated" or "tail orientated" directional pattern for linear log periodic arrays. Embodiments may be useful for implementing an ultra-wide band "end fire" directional array architecture with low profile radiating element. Time delay allows for dispersion-free, ultra-wide band circular 2D active electronically scanned array architecture It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An antenna comprising:
   a plurality of log periodic radiating elements, each log periodic radiating element comprising a planar radiating element disposed in a flexible blanket to conform to a doubly curved surface, a diameter of each radiating element defined by an operating frequency band of the radiating element; and
   a plurality of active driving elements, each uniquely associated with one or more of the plurality of radiating elements,
   wherein:
      the plurality of active driving elements are driven to avoid traveling waves along the plurality of log periodic radiating elements;
      each active driving element is configured to apply an amplitude phase shift to replicate frequency impedance and current excitation of a passive feed; and
      the log periodic radiating elements are disposed radially about a center point to define concentric active regions, each concentric active region corresponding to a frequency operating range.

2. The antenna of claim 1, wherein each of the plurality of log periodic radiating elements comprise radiating elements that do not require a ground plane layer in the corresponding active driving element.

3. The antenna of claim 2, wherein each of the plurality of log periodic radiating elements comprises a horizontal dipole.

4. The antenna of claim 2, wherein each of the plurality of active driving elements comprises an artificial magnetic conductor scaled according to an operating frequency of the corresponding log periodic radiating element.

5. The antenna of claim 1, wherein the plurality of active driving elements are configured to drive their corresponding log periodic radiating elements, at their operating frequency, without frequency dispersion.

6. The antenna of claim 1, wherein each of the plurality of active driving elements comprises at least one active quadrature feed element connected to a corresponding log periodic radiating element.

7. The antenna of claim 6, wherein the plurality of log periodic radiating elements are driven by a corresponding active driving elements to produce a circularly polarized beam.

8. The antenna of claim 1, wherein each of the plurality of log periodic radiating elements are driven to produce an end fire radiation pattern.

9. A mobile platform including a conformal radar antenna comprising:
- a plurality of log periodic radiating elements, each loci periodic radiating element comprising a planar radiating element disposed in a flexible blanket to conform to a doubly curved surface, a diameter of each radiating element defined by an operating frequency band of the radiating element; and
- a plurality of active driving elements, each uniquely associated with one or more of the plurality of radiating elements, wherein:
- the plurality of active driving elements are driven at their operating frequency to avoid traveling waves along the plurality of log periodic radiating elements without frequency dispersion;
- each active driving element is configured to apply an amplitude phase shift to replicate frequency impedance and current excitation of a passive feed; and
- the log periodic radiating elements are disposed radially about a center point to define concentric active regions, each concentric active region corresponding to a frequency operating range.

10. The mobile platform of claim 9, wherein each of the plurality of log periodic radiating elements comprise radiating elements that do not require a ground plane layer in the corresponding active driving element.

11. The mobile platform of claim 10, wherein each of the plurality of log periodic radiating elements comprises a horizontal dipole.

12. The mobile platform of claim 10, wherein each of the plurality of active driving elements comprises an artificial magnetic conductor scaled according to an operating frequency of the corresponding log periodic radiating element.

13. The mobile platform of claim 9, wherein each of the plurality of active driving elements comprises at least one active quadrature feed element connected to a corresponding log periodic radiating element.

14. The mobile platform of claim 13, wherein the plurality of log periodic radiating elements are driven by a corresponding active driving elements to produce a circularly polarized beam.

15. The mobile platform of claim 9, wherein each of the plurality of log periodic radiating elements are driven to produce an end fire radiation pattern.

* * * * *